Jan. 22, 1963   L. T. SKEGGS ET AL   3,074,699
APPARATUS FOR TREATING A LIQUID WITH A GAS
Filed Oct. 17, 1958   2 Sheets-Sheet 1
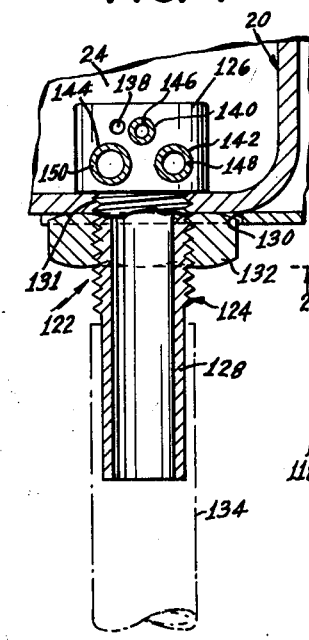
FIG. 4
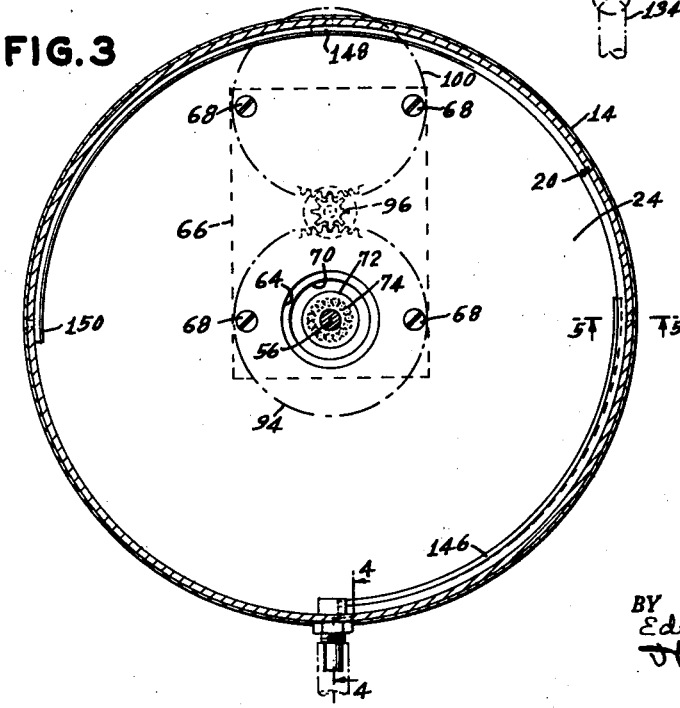
FIG. 1
FIG. 3
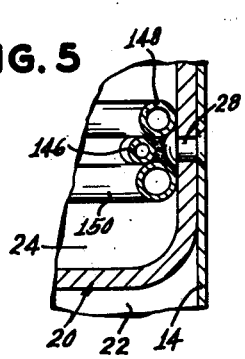
FIG. 5
INVENTORS
Leonard T. Skeggs
BY Gerald Hessler
ATTORNEYS

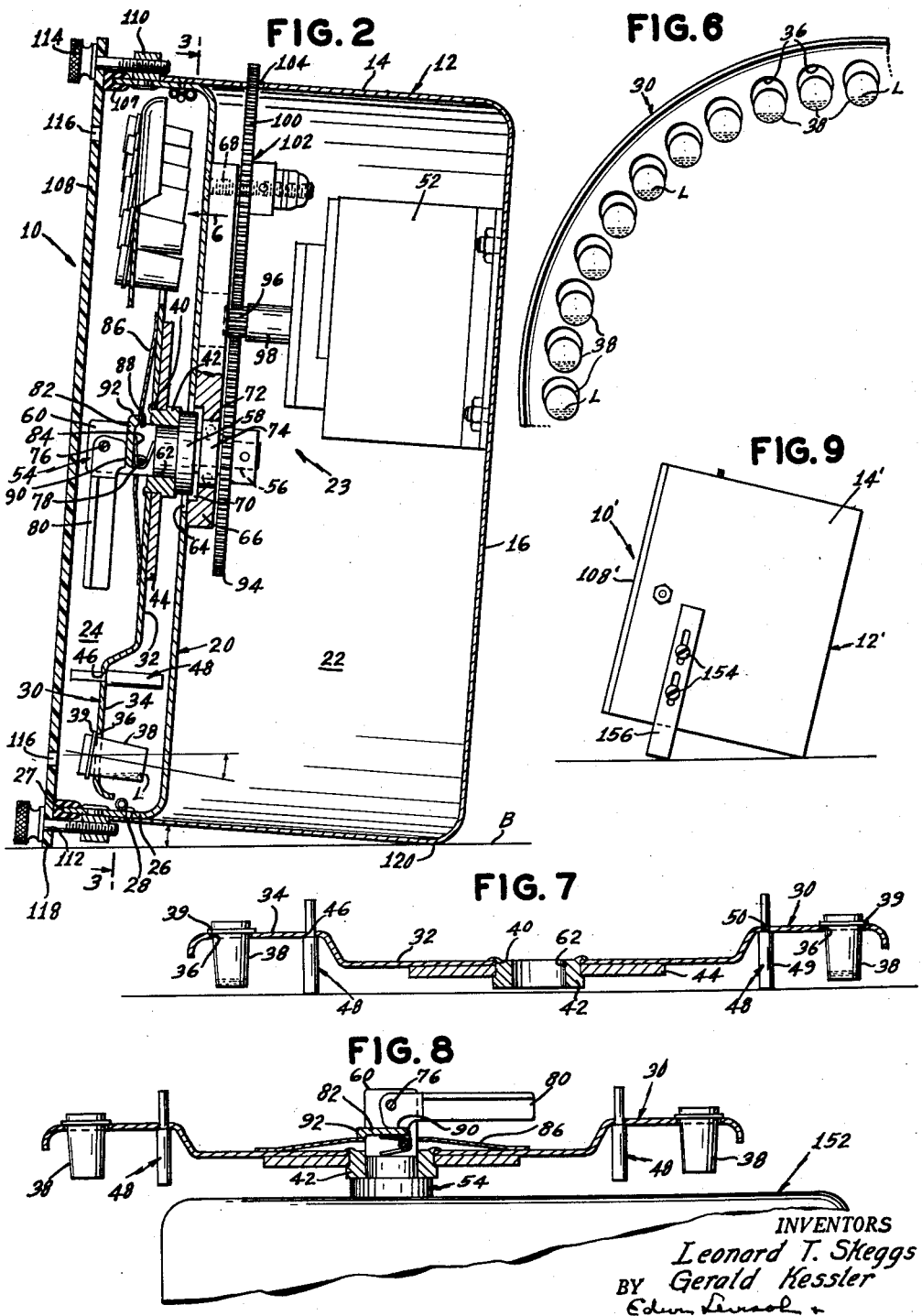

United States Patent Office 3,074,699
Patented Jan. 22, 1963

1

3,074,699
APPARATUS FOR TREATING A LIQUID
WITH A GAS
Leonard T. Skeggs, Cleveland, Ohio, and Gerald Kessler,
Tarrytown, N.Y., assignors to Technicon Instruments
Corp., Chauncey, N.Y., a corporation of New York
Filed Oct. 17, 1958, Ser. No. 767,869
4 Claims. (Cl. 261—83)

The present invention relates to apparatus for combining and saturating liquid samples with a gaseous substance for use in analysis, monitoring, control and other operations. More particularly the present invention relates to apparatus for combining and saturating a plurality of blood serum samples with carbon dioxide in order to prepare said samples for quantitative analysis in respect to the carbon dioxide content of the blood samples.

It is well known that the $CO_2$ capacity of blood plasma is a clinical measure of acidosis and of a plurality of other characteristics. A quantitative determination of $CO_2$ capacity in blood is thus of great importance in blood analysis. Various methods for determining $CO_2$ capacity of blood may be found in "Practical Physiological Chemistry" by Hawk, Oser and Summerson, Twelfth Edition, published by the Blakiston Company of Philadelphia. It is, therefore, of great importance that the blood samples which are to be analyzed for their $CO_2$ capacity be exposed to their fullest and maximum extent to the $CO_2$ so that they may truly and completely be combined therewith and thus be saturated thereby.

It is an object of the present invention to provide apparatus for combining and saturating liquids with a gaseous substance, said apparatus being of such character that maximum exposure of the liquids to the gaseous substance is accomplished in a simple and convenient way which will ensure maximum saturation of said liquid samples, respectively, with said gaseous substance according to the absorption capacity of the particular liquids, respectively, for said gaseous substance. In the case of blood, the carbon dioxide with which the blood is to be saturated is in the form corresponding quantitatively to its presence in alvedar air in the human body, i.e., air containing about 5% carbon dioxide by volume.

Another object of the present invention is the provision of apparatus of the above indicated character which is well adapted for combining, saturating and equilibrating blood serum samples with $CO_2$, in preparation of said samples for subsequent quantitative analysis in respect to the $CO_2$ content of the blood of the subjects.

A yet further object of the invention is generally to provide an improved apparatus for treating liquids with a gaseous substance, and particularly for saturating blood or blood plasma with carbon dioxide.

The above and other objects, features and advantages of the present invention will be fully understood from the following description considered in connection with the accompanying drawings which are illustrative of the presently preferred mode of practicing this invention.

In the drawings:

FIG. 1 is a plan view of the saturating apparatus pursuant to the present invention, with parts broken away to show the internal construction thereof;

FIG. 2 is a section along line 2—2 of FIG. 1, showing the apparatus in its operating position;

2

FIG. 3 is a sectional view along line 3—3 of FIG. 2;
FIG. 4 is a partial section, on an enlarged scale, along line 4—4 of FIG. 3;
FIG. 5 is a partial section, on an enlarged scale, along line 5—5 of FIG. 3;
FIG. 6 is a partial view taken in the direction of arrow 6 in FIG. 2;
FIG. 7 is a section of the sampler plate;
FIG. 8 is a view similar to FIG. 7 and showing the sampler plate mounted on an automatic fluid sample supply apparatus; and
FIG. 9 is a side view, on a reduced scale, of a modification of the saturating apparatus.

Referring now to the drawings in detail, the saturating apparatus pursuant to the present invention is generally indicated by the reference numeral 10. Said apparatus is especially useful in connection with the automatic fluid sample supply apparatus of the type illustrated in U.S. Patent No. 3,038,340 issued June 12, 1962, and said apparatus is also especially useful in conjunction with an automatic analyzing apparatus of the type illustrated in the patent to Skeggs, one of the joint inventors herein, No. 2,797,149, issued June 25, 1957. The above cited patents are assigned to the assignee hereof and it will be understood that the utility of the apparatus 10 of the present invention is not limited to use with the apparatus described in said patents.

The apparatus 10 comprises a housing 12 having a peripheral wall 14, an end wall 16 and an opening 18 opposite thereto. Housing 12 is provided with a dish shaped member 20 which defines within said housing a compartment 22 for housing the drive means 23 for apparatus 10, and a compartment 24 which defines the saturation chamber for said apparatus. Member 20 is provided with a peripheral skirt 26 complementary to peripheral wall 14 of the housing, and is secured thereto in any suitable way as, for example, by means of rivets 28. Peripheral skirt 26 extends beyond housing 12 and terminates in peripheral end edge 27. Housing 12 and member 20 may be made of any suitable metal, such as aluminum for example, or may be made of a suitable plastic. Housing 12 is provided in compartment 24 thereof with a sampler plate 30 of generally circular configuration, and having an inner portion 32 and an outer portion 34 axially spaced therefrom. Plate 30 is formed preferably of an aluminum stamping and is provided at said outer portion 34, adjacent the circumference of the plate, with a plurality of apertures 36 arranged in a circular row, each of said apertures being adapted to receive a receptacle 38 provided with a circumferential rib 39, whereby said receptacles are movably supported by the sampler plate as will hereinafter be described in greater detail. Receptacles 38 are preferably molded in one piece from a suitable plastic or of glass, rib 39 being integral with the body of the receptacle.

The sampler plate 30 is provided with a central aperture 40 which receives a hub 42 to which it is suitably secured together with an apertured circular disc 44 for giving sampler plate 30 added rigidity, as best shown in FIGS. 2, 7 and 8. Outer portion 34 of sampler plate 30 is also provided with a plurality of equally spaced apertures 46 arranged in a circular row and disposed inwardly of apertures 36. Each aperture 46 receives a pin 48 press fitted therein and having a portion 49 of enlarged diameter so as to define shoulders 50 which are in contacting supporting relation with the undersurface of sampler plate 30, for reasons to be described hereinafter in greater detail.

Sampler plate 30 is adapted to be rotated about its axis, either by means of motor 52 or manually, through the medium of shaft assembly 54. Said assembly comprises a shaft 56 which mounts a disc support 58 and an adaptor shaft 60 which extends through aperture 62 in hub 42. Disc support 58 extends through an aperture 64 in member 20. A relatively thick metal plate 66 is secured onto member 20 by any suitable means, such as screws 68, and said plate 66 is recessed as at 70 to provide clearance for disc support 58, and is provided with an aperture 72 in which there is press fitted a roller bearing 74 for shaft 56. The adaptor shaft 60 is bifurcated (FIG. 1) and is provided with the pair of pivot pins 76, 78 which are mounted by the bifurcations thereof. The pivot pin 76 mounts a locking handle 80 and the pivot pin 78 mounts a clamping bar 82 and a leaf spring 84 which resiliently biases the bar 82 for counterclockwise rotation viewing FIG. 2.

The sampler plate 30 is releasably connected to shaft assembly 54 by a clamping disc 86. The disc 86 is centrally apertured as at 88 for reception of the shaft adaptor 60 when the locking handle 80 is raised from the position illustrated thereof in FIG. 2 into axial alignment with the adaptor shaft 60. This retracts the cam surface 90 of the locking handle 80 from the clamping bar 82, the latter then being pivoted by the spring 84 so as to free end 92 thereof which lies within the bifurcated adaptor shaft 60. Consequently, with the handle 80 and the clamping bar 82 so disposed, the clamping disc 82 may be slipped over the handle 80 for disposition on the upper surface of the sampler plate 30. When the locking handle 80 is in its clamping position, it will be apparent that clamping disc 86 will be operative, through sampler plate 30, the urge hub 42 into frictional engagement with disc support 58 so that rotation of the latter will cause rotation of sampler plate 30.

A spur gear 94 is mounted on shaft 56 and is in mesh with a pinion 96 which is carried by drive shaft 98 of motor 52. Pinion 96 is also in mesh with spur gear 100 which is suitably mounted by plate 66 for rotation, as indicated generally at 102. Gear 100 projects out of housing 12 through an aperture 104 provided therefor in peripheral wall 14 of the housing so that gear 100 is accessible outwardly of the housing for the manual operation thereof.

Peripheral end edge 27 of member 20 is provided with an interfitting channelled gasket 107, and a preferably transparent cover plate 108 closes opening 18 of housing 12, and defines with gasket 107 a fluid tight seal for saturation chamber 24. As shown in FIG. 1, cover plate 108 is of generally rectangular configuration and extends beyond the periphery of housing 12, the latter being provided with nuts 110 fixedly secured to and projecting outwardly of the peripheral skirt 26 of member 20. Cover plate 108 is provided with apertures 112 in registry with the threaded apertures on nuts 110 so that cover plate 108 may be secured onto housing 12 in fluid tight relation by means of thumb screws 114 which extend through apertures 112 and threadedly engage nuts 110. Cover plate 108 is provided with equally spaced apertures 116 arranged in a circular row having a radius equal to that of the circular row of apertures 36 in sampler plate 30 so that when the cover plate is secured onto the housing in the manner described hereabove, the receptacles 38 which are disposed in apertures 36 may be sequentially brought into registry with the apertures 116.

FIGURE 2 shows the apparatus 10 disposed in its operative position for saturating the receptacle contents. As shown therein, the apparatus 10 is supported on a base B at the lower edge 118 of cover plate 108 and corner 120 of housing 12, and since cover plate 108 extends beyond the periphery of housing 12, the housing will be tilted from the vertical, as will sampler plate 30 which is disposed therein.

As previously stated, sampler plate 30 is adapted to carry a plurality of open top receptacles 38 in apertures 36. Each receptacle 38 is cup shaped and increases in diameter from its bottom wall to its top opening, and the diameter of the receptacle immediately below circumferential ridge 39 is slightly smaller than aperture 36. When the sampler plate is in the tilted position thereof, previously described and illustrated in FIG. 2, the receptacles 38 will be tilted relative to the sampler plate by virtue of the fact that the apertures 36 in the sampler plate are of larger diameter than the diameter of the respective receptacles 38 below the ridge 39, and since sampler plate 30 is tilted from the vertical by virtue of the tilted disposition of apparatus 10, the total tilt of the receptacle will be equal to the summation of the tilt of the sampler plate relative to the vertical, and the tilt of the receptacle 38 relative to the sampler plate. When so disposed in apparatus 10, each of said receptacles 38 is adapted to have a small amount of liquid substance L disposed therein, and said liquid contents of each of said receptacles will have a substantially maximum surface thereof exposed to the surrounding atmosphere through the open tops of the receptacles, the receptacles being tilted just sufficiently with the open tops of the receptacles above their companion bottoms to prevent any spilling of the liquid L from the receptacles. This is true of the liquid in each receptacle carried by sampler plate 30, whether such receptacle is disposed lowermost or uppermost in said apparatus. Upon rotation of sampler plate 30 with respect to the housing 12 by means of motor 52, in the manner previously described, receptacles 38 will be rotated about their respective longitudinal axes relative to the sampler plate 30 since at each point along their circular path, the lowermost part of the respective receptacles 38 will be in engagement with the lowermost wall portion of the associated aperture 36, as best shown in FIG. 6.

It is further apparent that as the sampler plate is rotated, the liquid substance in each receptacle will also have movement relative to the associated receptacle whereby different portions of the liquid receptacle contents L are exposed to the surrounding atmosphere. Accordingly, rotation of sampler plate 30 in the manner indicated is operative and effective to, at all times expose a maximum surface of the receptacle contents to the surrounding atmosphere, and to continuously change the portions of the receptacle contents which comprise said maximum exposure surface.

As stated above, the apparatus of the present invention is particularly well suited for determining certain properties of blood serum, and more specifically for the purpose of measuring the combining power of blood serum with $CO_2$. When apparatus 10 is used for the above stated object, the samples which are inserted in the respective receptacles 38 comprise blood serum and said samples are adapted to be exposed to $CO_2$ for the saturation thereof in chamber 24 which will now be referred to as the $CO_2$ chamber.

As seen in FIGS. 1 and 4, provision is made for introducing $CO_2$ into chamber 24 by means of gas inlet assembly 122. The gas inlet assembly comprises a gas inlet member 124 having a head 126 disposed inwardly of chamber 24 and a tubular stem 128 extending through a threaded aperture 131 in member 20 and aperture 130 in peripheral wall 14 of the housing, outwardly thereof. A locking nut 132 secures the gas inlet assembly in place on the housing. A conduit 134 connects the gas inlet assembly to a source of $CO_2$ (not shown) through a control valve 136. Head 126 is provided at one side thereof with outlet apertures 138, 140, 142 and 144, of increasing diameter. Apertures 140, 142 and 144 are provided with conduits 146, 148 and 150, respectively, which extend circumferentially of chamber 24. As best seen in FIG. 3, conduit 146 extends approximately for one-fourth of the circumference, conduit 148 extends approximately for one-half of the circumference and conduit 150 extends approximately for three-fourths of the circumference of chamber 24. Thus it will be noted that there are four gas inlets into chamber 24, namely those provided by aperture 138, conduits 146, 148 and 150, which are spaced 90° apart and which are each adapted to supply $CO_2$ under pressure in a direction tangentially of the $CO_2$ chamber, in order to provide a continuous and even distribution of $CO_2$ throughout chamber 24. The respective conduits 146, 148 and 150 are held in position inside chamber 24 by a welded connection to the respective rivets 28, as best shown in FIG. 5.

The following is an illustrative but non-limitative description of the apparatus 10, when used to combine and saturate blood serum with $CO_2$. Sampler plate 30 is placed in a horizontal disposition in which it is supported by support pins 48, as shown in FIG. 7. In this position of the sampler plate, the receptacles 38 are inserted in apertures 36, and small quantities of the samples of blood which are to be saturated with $CO_2$ are placed in the respective receptacles. The housing 12 with its cover removed is also placed in a horizontal disposition, in which it rests on end wall 16. The locking handle 80 is raised to its position in which it is in axial alignment with the adaptor shaft 60, to permit sampler plate 30 to be inserted in the housing, and locked in position in the manner previously described. The cover plate 108 is then secured onto the housing by means of thumb screws 114, and the housing is now slowly moved from its horizontal position to the position illustrated in FIG. 2 in which it is supported along lower edge 118 of the cover plate 108 and corner 120 of the housing. In this position, as pointed out before, the sampler plate is tilted at an angle from the vertical, and the receptacles will also assume a tilted position relative to the sampler plate due to the clearance between the respective receptacles 38 and their associated apertures 36. In this position there is also a maximum amount of the blood sample in each receptacle which is exposed to the surrounding atmosphere. Valve 136 is now opened to permit air containing 5% $CO_2$ by volume (corresponding to alveolar air) under pressure to enter chamber 24 through aperture 138 and conduits 146, 148 and 150 at four circumferentially spaced points, the air-$CO_2$ mixture entering tangentially of the chamber and having a generally counterclockwise direction of movement, viewing FIG. 3. Motor 52 is now energized to impart rotary movement to sampler plate 30 about its own axis in a direction opposite to that of the entering gas. In this way the blood samples in the receptacles are more thoroughly exposed to the entering gas. In addition, as has hereabove been pointed out, the blood samples in the receptacles have a maximum surface exposed to the surrounding gas and the portions of the blood which comprise the exposure surface in each receptacle vary continuously as the sampler plate rotates in the housing. It will be noted that chamber 24 is under sufficient pressure so as to prevent any outside air from entering the chamber through apertures 116.

After the sampler plate has been rotated for the requisite length of time to permit complete saturation of the blood samples with $CO_2$, the motor 52 is de-energized and the housing 12 is slowly moved back to its horizontal position, in which it is supported on end wall 16. In this position, and while the gas is still entering into the chamber under pressure, sampler plate 30 is manually rotated by means of gear 100 to bring the receptacles successively in registry with apertures 116 in the cover plate so that a drop of mineral oil may be deposited in each receptacle to cover the surface of the blood sample therein in order to prevent outside air from coming into contact with these blood samples. When said drop of oil has been deposited in each receptacle, valve 136 is closed to shut off the gas supply. The sampler plate may now be removed from housing 12 and attached to an automatic fluid sample supply apparatus 152 (FIG. 8) of the type illustrated in the above referred to U.S. Patent No. 3,038,340, said apparatus being provided with sampler plate mounting and locking means identical to those described in connection with FIG. 2.

FIG. 9 shows a modified embodiment of the apparatus 10' according to the invention and comprises a housing 12' which is provided with the same parts as housing 12, previously described in connection with FIG. 2. A cover plate 108' is provided for housing 12' and is coextensive in area with said housing which may be of rectangular configuration, as shown. According to the embodiment of FIG. 9, housing 12' is provided with means for adjustably varying the angle of tilt of the apparatus. Toward that end, each of the opposing side walls 14' (only one of which is shown) is provided with a pair of spaced threaded apertures in which a pair of screws 154 are engageable to releasably secure a slotted support member 156 onto the housing. The angle of tilt of apparatus 10' can thus be adjusted by loosening screws 154 and moving slotted member 156 in the desired direction, for supporting the apparatus in the desired tilted disposition.

While the present invention has been described with particular reference to, and emphasis on, the saturation of blood serum with $CO_2$, it will be understood that the invention is equally useful for treating other liquids with a gaseous substance. It will be understood that while the invention has been described and illustrated as having a housing which is disposed in a tilted disposition during the saturation operation, it would be equally possible to carry out the objects of the invention by supporting said housing in a vertical disposition during the saturation operation. With such an arrangement, the sampler plate would be rotated about a horizontal axis and the respective receptacles would still be disposed in a tilted disposition by virtue of the clearance between the receptacles and the associated apertures, respectively, on the sampler plate. It will also be understood that the invention may be carried out otherwise than herein illustrated or described and that in the illustrated embodiment certain changes in the details of construction and in the mode of practicing the invention may be made without departing from the underlying idea or principles of this invention within the scope of the appended claims.

We claim:

1. Apparatus for simultaneously treating a series of separate liquid samples with a gas comprising, an upright sampler plate lying in a plane slightly inclined from the vertical, said plate presenting an upper face side and having a central, normal axis, slightly inclined from the horizontal, means for rotating said plate about said axis, said plate having a series of circular apertures laterally spaced from each other and arranged in a circular row around said axis, a series of open top receptacles for holding liquid samples, each of said receptacles having an outer circular wall of a lesser diameter than each of said apertures, an inner wall, and a bottom wall, means on each of said receptacles for removably retaining each of said receptacles in a separate aperture of said plate on an axis inclined slightly to the horizontal with said open top of said receptacles located on said upper face side of said plate and the remainder of said receptacles extending downwardly through said apertures whereby the liquid samples held in each receptacle lie partially on the inner side wall and bottom wall thereof thereby presenting a relatively large liquid surface area, gas chamber means surrounding said plate, means for supplying gas to said chamber means, whereby rotation of said plate will cause rotation of each of said receptacles about its respective inclined axis to expose different portions of said liquid samples in each of said receptacles to said gas in said chamber means.

2. The apparatus of claim 1 wherein the gas supply means includes means to supply gas in said chamber in a direction opposite to the direction of rotation of said plate.

3. The apparatus of claim 1 wherein the gas supply means includes a plurality of gas outlet means in said chamber.

4. The apparatus of claim 1 wherein the gas supply means includes means to supply the gas tangentially into said chamber.

References Cited in the file of this patent

UNITED STATES PATENTS

| | | |
|---|---|---|
| 769,330 | Timby | Sept. 6, 1904 |
| 831,941 | Erlinger | Sept. 25, 1906 |
| 981,098 | McCaskell | Jan. 10, 1911 |
| 1,566,770 | Packer | Dec. 22, 1925 |
| 1,861,878 | Quiroz | June 7, 1932 |
| 2,180,847 | Nordell | Nov. 21, 1939 |
| 2,550,701 | Lardy | May 1, 1951 |
| 2,599,252 | McClain | June 10, 1952 |
| 2,653,083 | Wanzer et al. | Sept. 22, 1953 |
| 2,680,060 | Natelson | June 1, 1954 |
| 2,721,732 | Melrose | Oct. 25, 1955 |
| 2,879,141 | Skeggs | Mar. 24, 1959 |